United States Patent [19]
Delprete et al.

[11] Patent Number: 5,820,391
[45] Date of Patent: Oct. 13, 1998

[54] MINIATURE CARD INTERFACE CONNECTOR

[75] Inventors: Stephen D. Delprete, Rehoboth, Mass.; Andrew H. Strange, Eagleville, Pa.

[73] Assignee: Thomas & Betts International, Inc., Sparks, Nev.

[21] Appl. No.: 674,445

[22] Filed: Jul. 2, 1996

[51] Int. Cl.⁶ .................................................. H01R 4/58
[52] U.S. Cl. ........................... 439/91; 439/326; 439/630; 439/681; 439/489
[58] Field of Search ................................ 439/66, 91, 681, 439/59, 489, 630, 377, 67, 71, 108, 326, 72

[56] References Cited

U.S. PATENT DOCUMENTS

| | | | |
|---|---|---|---|
| 4,344,662 | 8/1982 | Dalamangas et al. | 439/59 |
| 4,426,122 | 1/1984 | Laimez et al. | 439/45 |
| 4,490,811 | 12/1984 | Yianilos et al. | 364/900 |
| 4,744,009 | 5/1988 | Grabble et al. | 439/72 |
| 4,830,618 | 5/1989 | David | 434/169 |
| 4,891,775 | 1/1990 | McWherter | 364/705.06 |
| 4,982,181 | 1/1991 | Yianilos | 340/756 |
| 5,007,019 | 4/1991 | Squillante et al. | 364/900 |
| 5,113,340 | 5/1992 | McWherter | 364/419 |
| 5,153,831 | 10/1992 | Yianilos | 364/419 |
| 5,163,837 | 11/1992 | Rowlette, Sr. | 439/91 |
| 5,203,705 | 4/1993 | Hardy et al. | 434/169 |
| 5,218,536 | 6/1993 | McWherter | 364/419 |
| 5,229,936 | 7/1993 | Decker et al. | 364/419 |
| 5,249,965 | 10/1993 | Yianilos | 434/177 |
| 5,295,070 | 3/1994 | Justice | 364/419.02 |
| 5,321,609 | 6/1994 | Yianilos et al. | 364/419.13 |
| 5,333,313 | 7/1994 | Heising | 395/600 |
| 5,378,169 | 1/1995 | Volz et al. | 439/376 |
| 5,413,489 | 5/1995 | Switky | 439/71 |
| 5,549,479 | 8/1996 | Elco et al. | 439/67 |

FOREIGN PATENT DOCUMENTS

| | | | |
|---|---|---|---|
| 0136379 | 4/1985 | European Pat. Off. | G06F 15/40 |

*Primary Examiner*—Neil Abrams
*Assistant Examiner*—Brian J. Biggi
*Attorney, Agent, or Firm*—Weingarten, Schurgin, Gagnebin & Hayes LLP

[57] ABSTRACT

An interface connector which facilitates connection between a miniature card and a host device is disclosed. The interface connector includes an elastomeric connection device, an insulating body and electrical contacts. The elastomeric connection device and electrical contacts provide electrical pathways between corresponding pads and contacts (e.g., data, power and ground) on the miniature card and the host. The insulating body is adapted to be received by the host and to receive the miniature card, and includes a castellated side wall which protects the elastomeric connection device from foreign objects. The insulating body also includes location pins which facilitate proper insertion and alignment of the connector with regard to the host device. A keying feature is provided to prevent insertion of incompatible miniature cards. A write protect feature is disclosed for use with writable miniature cards. A combined latch-card detection switch is also disclosed.

40 Claims, 13 Drawing Sheets

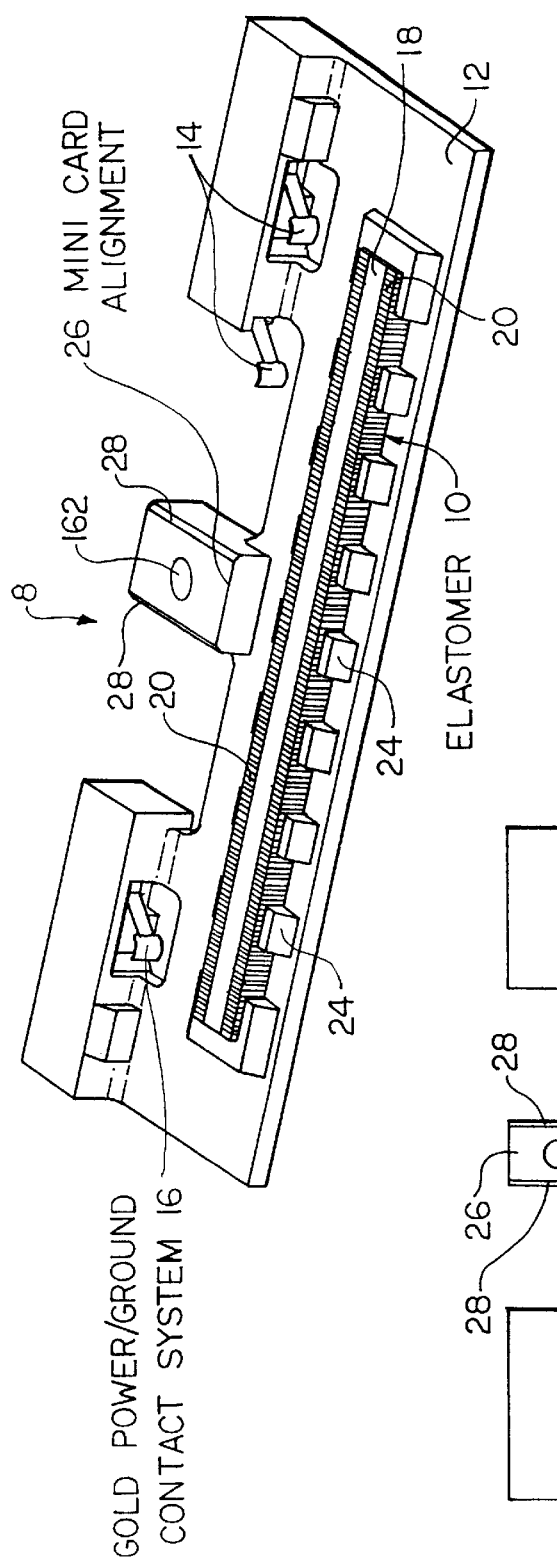
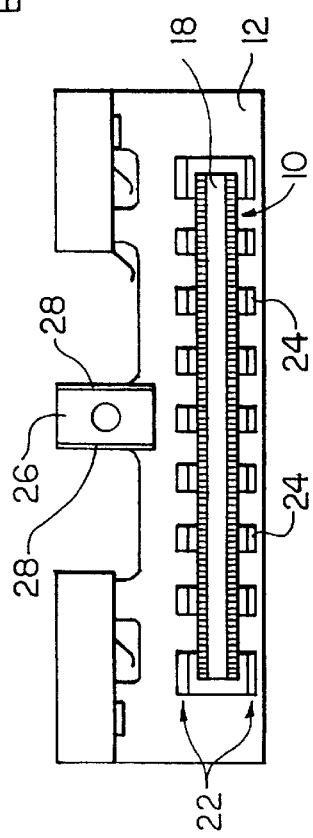
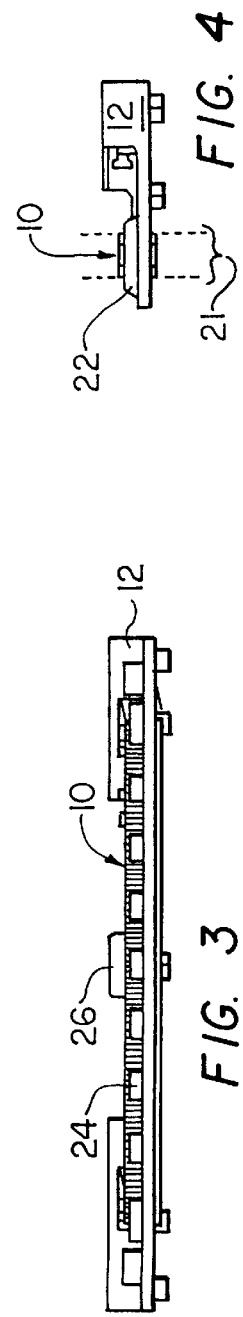

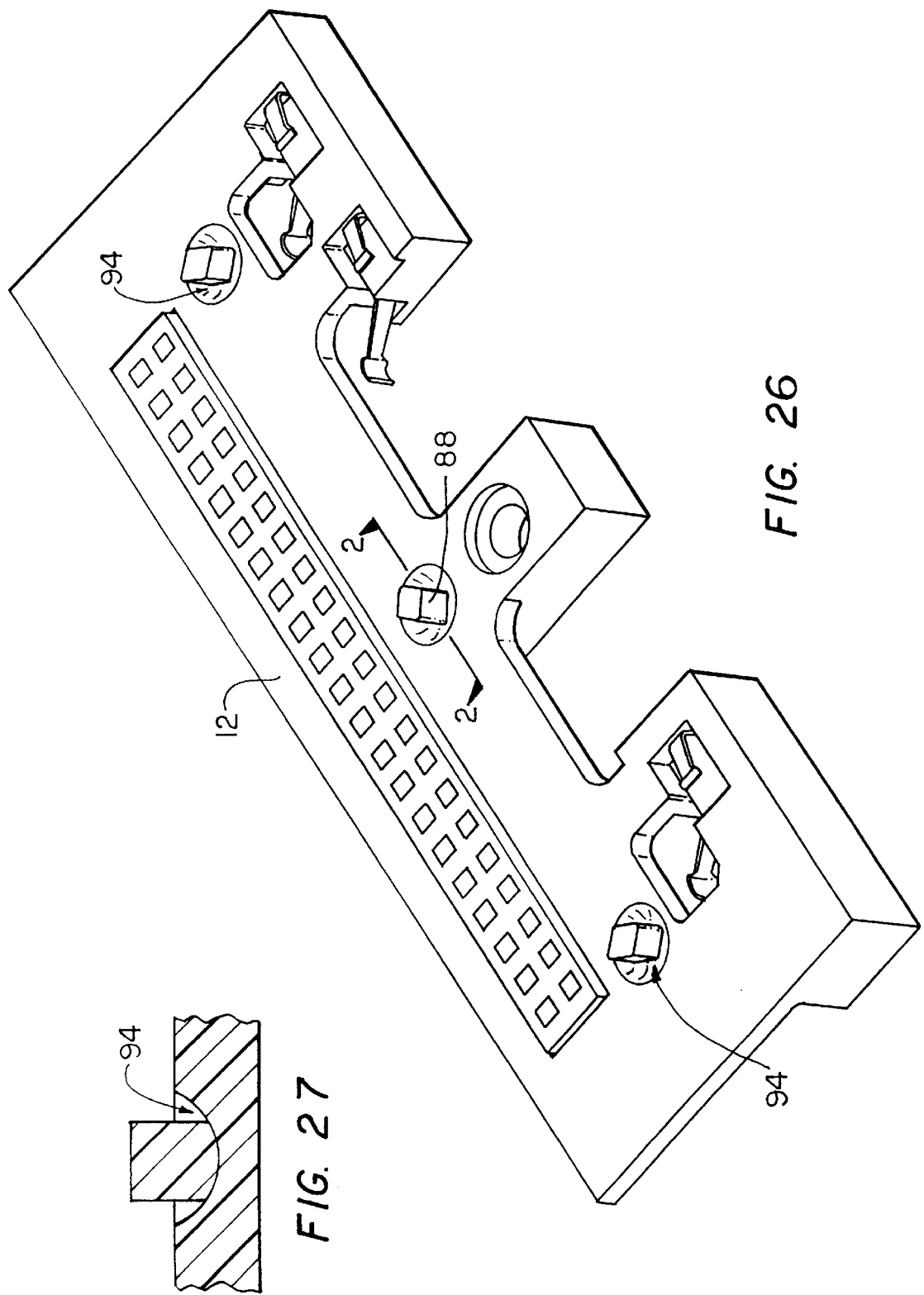

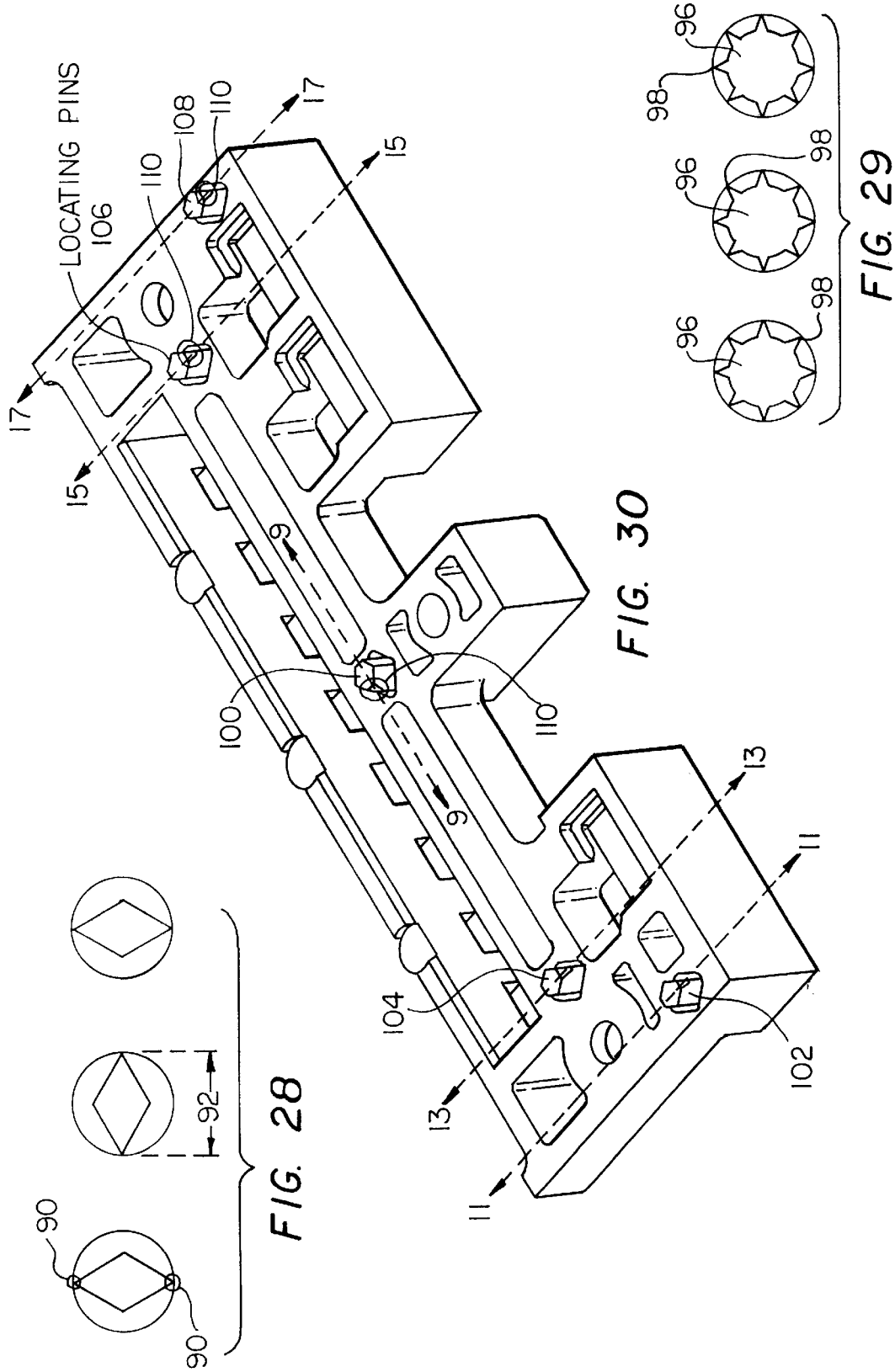

MINIATURE CARD INTERFACE CONNECTOR

FIELD OF THE INVENTION

The present invention is related to electrical connectors, and more particularly to connectors which facilitate interfacing a removable card with a host device.

BACKGROUND OF THE INVENTION

The use of removable, self-contained electronic devices, such as memory cards designed according to the PCMCIA standard, is known. Such devices offer advantages because of their relatively convenient size, typical plug and play compatibility and ease of removal, among other things. However, these advantages are dependent on providing reliable electrical connection between the removable device and the host device. It is therefore desirable to have a reliable and easy to use interface device for connecting removable devices to host devices.

SUMMARY OF THE INVENTION

In accordance with the present invention, a miniature card interface connector for connecting a miniature card to a host device includes an elastomeric connection device having top and bottom surfaces and electrical contacts which provide an electrical pathway between said top and bottom surfaces; and an insulating body with an opening adapted to receive said elastomeric connection device, said insulating body being further adapted to be received by the host and to receive the miniature card such that the elastomeric connection device provides electrical connection between corresponding electrically conductive pads on the miniature card and the host. The insulating body also includes a castellated sidewall disposed around the elastomeric connection device. The castellated sidewall shields the elastomeric connection device from foreign objects which might be inserted into the connector. The insulating body may also include an alignment feature for facilitating proper alignment of the connector with regard to the host device, and a keying feature for preventing connection of incompatible miniature cards to the host.

The present invention provides advantages related to both reliability and size. Improved reliability is provided by employing the elastomeric connection device rather than a traditional pin and socket type connector. The elastomeric connection device offers multiple contact points and multiple conductive paths for each connection. Further, the elastomeric connection device is rugged and does not use fragile pins which may bend or break when placed under strain. The interface connector and miniature card of the present invention are also smaller in size than corresponding PCMCIA components, and thus offer advantages normally associated with smaller size. Additionally, the interface connector and miniature card are well suited to use with modern flash memory components.

Various types of location pins may be used to provide secure alignment between the interface connector and the host device. More particularly, the interface connector may include pins with diamond-shaped cross-sections sized to fit into circular holes in the host device. An interference fit is provided because two point-contact edges of each pin contact sidewalls of the corresponding hole. Alternatively, the pins may have circular-shaped cross-sections and include radial ribs to provide a plurality of contact points when inserted into the hole. These designs provide positive alignment with increased tolerance for manufacturing process variations prior to insertion.

The keying feature of the present invention prevents incompatible miniature cards from being connected to the host. More particularly, the interface connector may employ an insert having at least one tab portion extending toward the miniature card. When a compatible miniature card is inserted, gaps on the miniature card mesh with the tabs on the insert, thereby allowing the miniature card to be connected to the host. However, when an attempt is made to insert an incompatible miniature card, the tabs on the insert physically block the non-matching gaps on the incompatible miniature card, thus preventing connection. Different inserts having different tab configurations can be employed for different types of miniature cards. The keying feature can be advantageously used to prevent damage which might be caused by voltage mismatches, such as from inserting a +3V powered miniature card into a +12V supplying host.

BRIEF DESCRIPTION OF THE DRAWING

The invention will be more fully understood from the following Detailed Description and the Drawing, in which:

FIG. 1 is a perspective view of a miniature card interface connector in accord with the present invention;

FIG. 2 is a plan view of the interface connector of FIG. 1;

FIG. 3 is a front view of the interface connector of FIG. 1;

FIG. 4 is a side view of the interface connector of FIG. 1;

FIGS. 25–30 illustrate location pins.

DETAILED DESCRIPTION OF THE DRAWING

Figure 5:
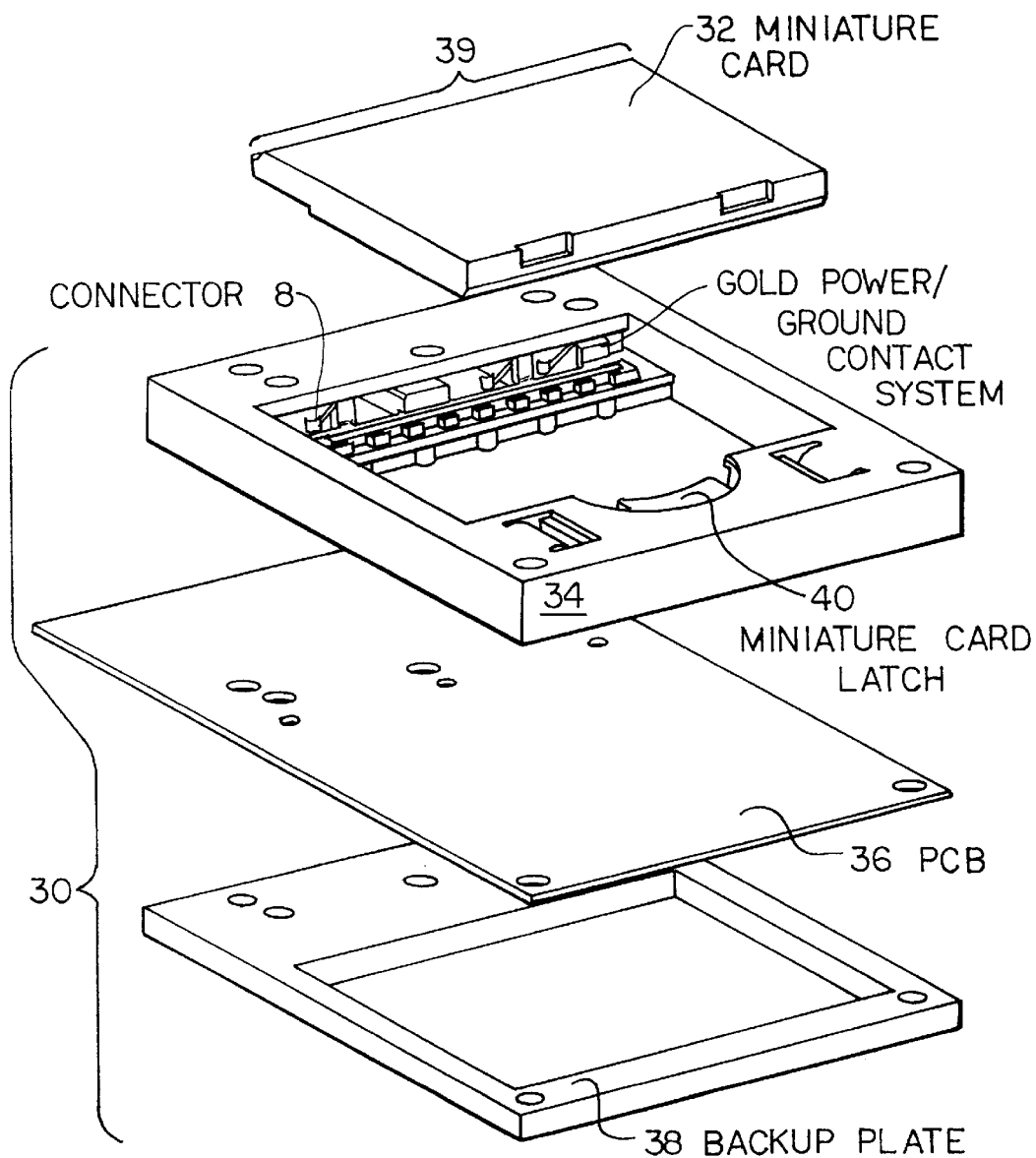
FIG. 5 is an exploded view of the interface connector in relation to a miniature card and host.

FIG. 1 illustrates an interface connector 8 for use with a host and a miniature card. The interface connector includes an elastomeric connection device 10, an electrically insulating body 12, ground contacts 14 and a power contact 16. The elastomeric connection device 10 extends through the insulating body 12 and includes an elastomeric insulator 18 and one or more rows of independent conductive contacts 20 situated therein. The conductive contacts extend through the elastomeric insulator, and thus through the insulating body.

Referring to FIGS. 1–4, the insulating body 12 includes an opening 21 (See also FIG. 11) which extends through the insulating body and is adapted to receive the elastomeric connection device 10 and allow the upper and lower surfaces of the elastomeric connection device to connect with a miniature card and host, respectively. The opening is crowned by a side wall 22 which includes a plurality of castellations 24. The opening has a width dimension which is smaller than a characteristic (non-deflected) width dimension of the elastomeric connection device prior to) insertion into the opening. As such, frictional force between the castellated side wall and the elastomeric connection device operate to secure the elastomeric connection device in place, and thus prevent the connector from falling out of the opening. Alternatively, the elastomeric connection device may be secured in place with an adhesive or other means known in the art.

The castellated side wall 22 is employed to support the elastomeric connection device 10 and to decrease the likelihood of foreign objects coming into contact with the elastomeric connection device. The castellations are separated by gaps. The miniature card may include a corresponding castellated wall with castellations which, when the miniature card is properly aligned with the interface connector, interface with the interface connector gaps such that the miniature card castellations do not physically contact interface connector castellations.

The interface connector may include an alignment feature such as a post 26 for facilitating proper alignment of the miniature card with respect to the interface connector. The post is disposed centrally on the interface connector and is formed as part of the insulating body. The post includes beveled edges 28 and is shaped to snugly interface with a cutaway section on the miniature card.

Figure 6:
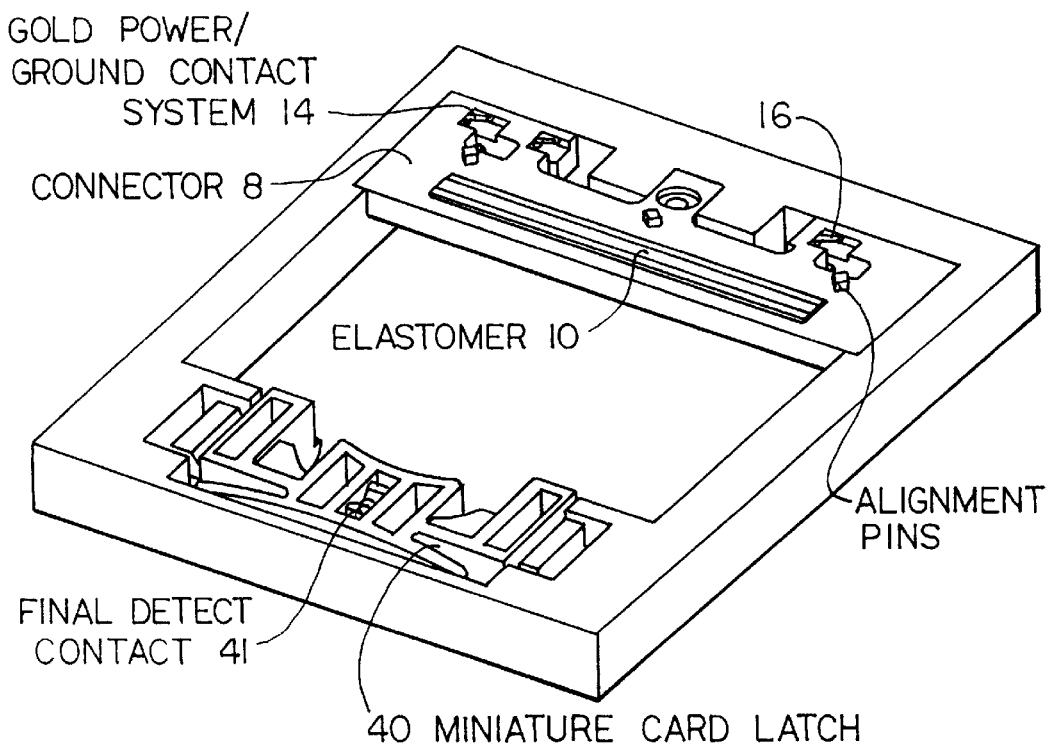
FIG. 6 is a perspective view of the bottom of the interface connector and frame of FIG. 5.
Figure 7:
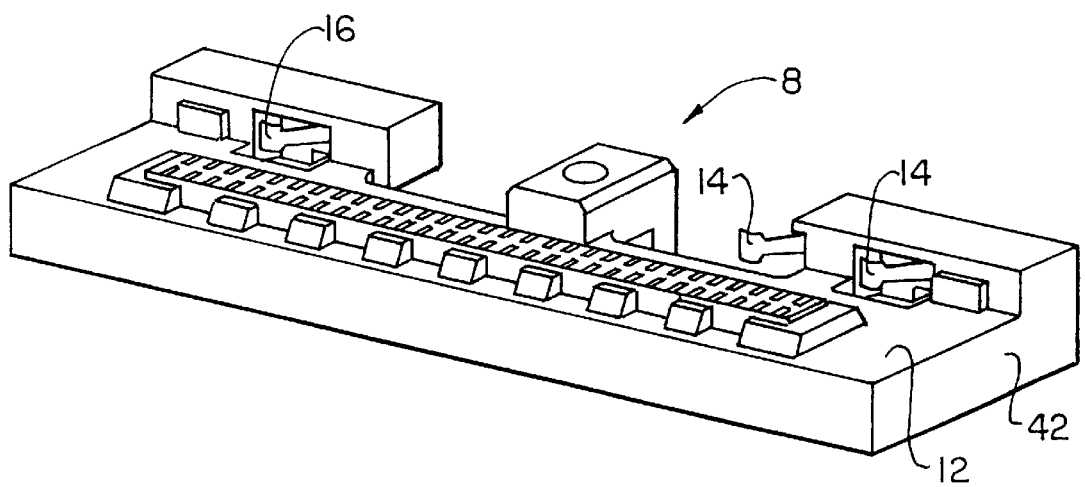
FIG. 7 is a perspective view of a high profile interface connector.
Figure 8:
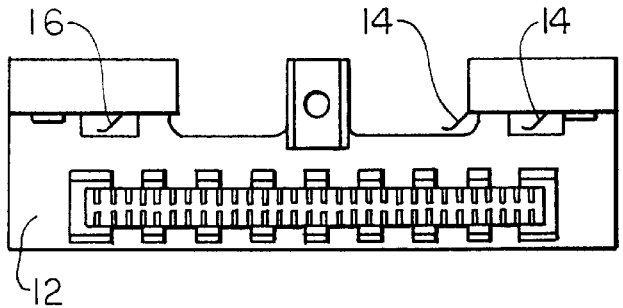
FIG. 8 is a plan view of the high profile interface connector.
Figure 9:
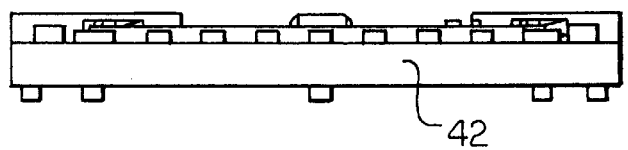
FIG. 9 is a front view of the high profile interface connector.
Figure 10:
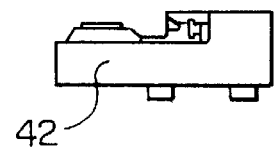
FIG. 10 is a side view of the high profile interface connector.

FIGS. 5–6 illustrates the interface connector 8 in relation to a host device 30 and a miniature card 32. The host includes a frame 34, a printed circuit board ("PCB") 36 and a backup plate 38. The PCB is sandwiched between the backup plate and the frame, which are secured by bolts of other suitable means.

The frame 34 is formed to receive the miniature card after receiving the interface connector. More particularly, the frame and the PCB form a recess into which the miniature card is securingly placed. The miniature card includes a forward portion 39 which fits between the interface connector and the frame. Contacts which correspond to ground and power contacts on the interface connector are disposed on the forward portion of the miniature card. The miniature card also includes a PCB having one or more rows of electrically conductive pads corresponding to the contacts of the elastomeric connection device. The host device similarly includes a PCB with corresponding power and ground contacts, as well as rows of electrically conductive pads for transmission of signals through the elastomeric connection device. A rear portion of the miniature card includes at least one surface which is secured by a latch 40 in the frame when the miniature card is inserted therein.

Electrical connections other than power and ground e.g., data lines, are provided via the elastomeric connection device 10. Typically, both the host 30 and the miniature card 32 include PCBs with rows of corresponding connection pads. Corresponding pads must be placed in electrical communication for proper operation. When the interface connector is inserted into the host, the lower surface of the elastomeric connection device deflects against the host pads. When the miniature card is subsequently inserted into the frame, the upper surface of the elastomeric connection device deflects against the miniature card pads. The host and miniature card are thus placed in electrical communication, and a PCB to PCB connection is provided through the elastomeric connection device.

The interface connector provides connection between the miniature card and interface device in a manner which is conducive to plug and play functionality. Because the castellated sidewall 22 is raised above the surface of the insulating body 12, the miniature card must be inserted in an angular fashion. When the miniature card power and ground contacts are pressed against the interface connector power and ground contacts 16, 14, the miniature card can then be pivoted downward until the corresponding rows of pads on the miniature card and host are in electrical communication, and the miniature card is secured in place by the latch 40. Thus, the miniature card power and ground contacts enter electrical communication with the host device before the data lines, as is desirable for plug and play functionality.

In order to provide an indication when a miniature card is inserted into the frame 34, a final detect contact 41 may be employed. The final detect contact is a metal beam with two high points. The contact 41 is heat staked to the plastic latch 40, and moves therewith as miniature cards are inserted into and removed from the frame. When the frame is mounted on the PCB 36 the high points of the final detect contact deflect against the surface of the PCB. Pads disposed on the PCB surface are employed to detect the position of the contact 41, and thus determine whether a miniature card is present in the frame. For example, the final detect contact can be aligned to form a short between the pads on the PCB in the presence of a miniature card in the frame, and to form an open between the pads in the absence of the miniature card.

In an alternative embodiment illustrated in FIGS. 7–10 the interface connector is configured for a deeper frame. The high profile interface connector 8 includes a deeper base 42 which may be constructed of solid polycarbonate. The base provides increased height for use with alternative configuration frames and miniature cards.

Figure 11:
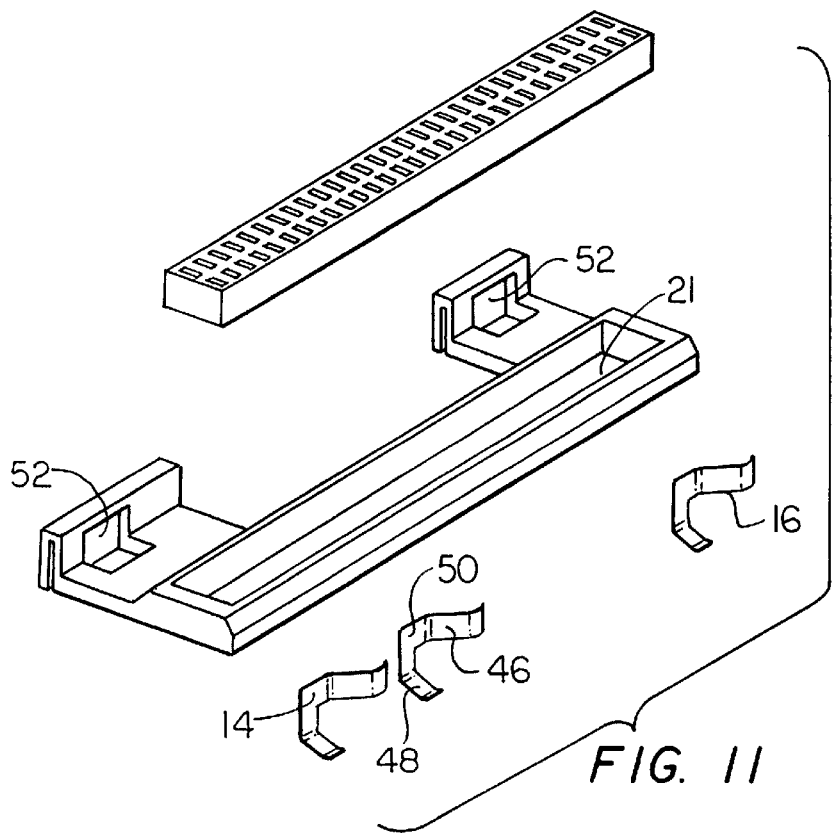
FIG. 11 is an exploded perspective view of the interface connector illustrating the horizontally deflecting power/ground contacts.
Figure 12:
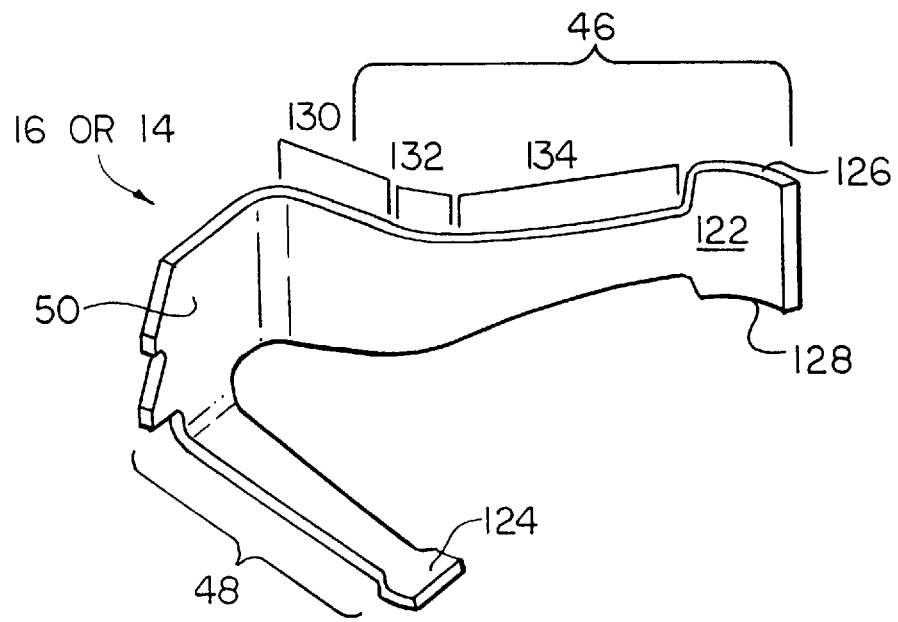
FIG. 12 is a perspective view of the horizontally deflecting power/ground contacts.
Figure 13:
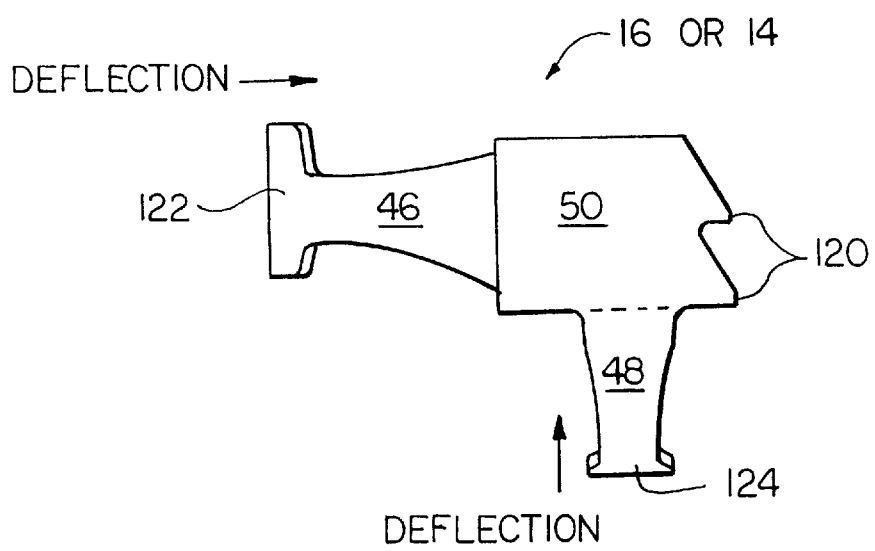
FIG. 13 is a side view of the horizontally deflecting power/ground contacts.
Figure 13A:
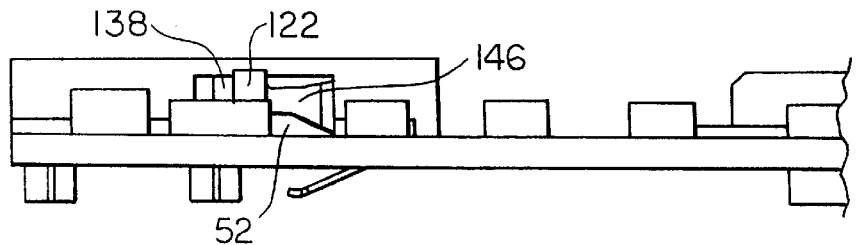
FIGS. 13a–13c further illustrate features of the power/ground contacts of FIGS. 12–13.
Figure 13B:
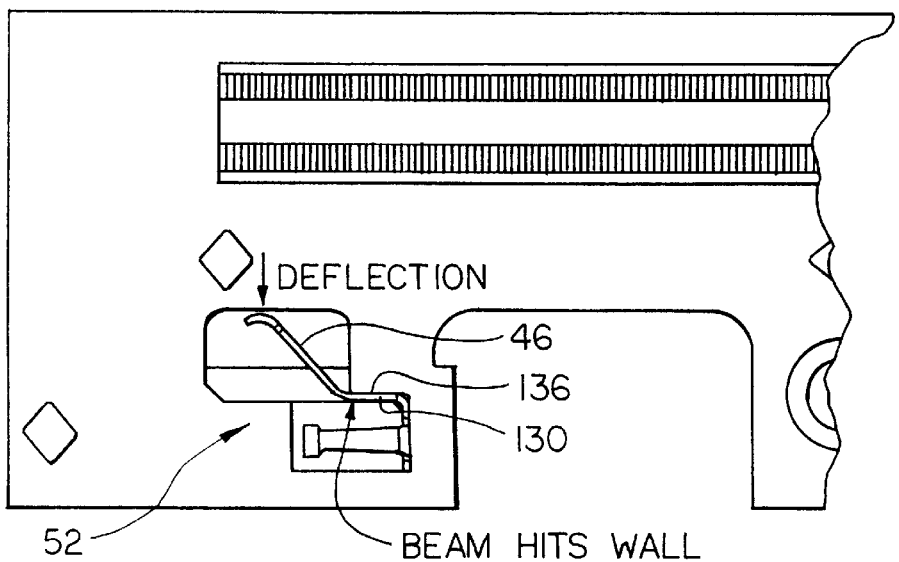
Figure 13C:
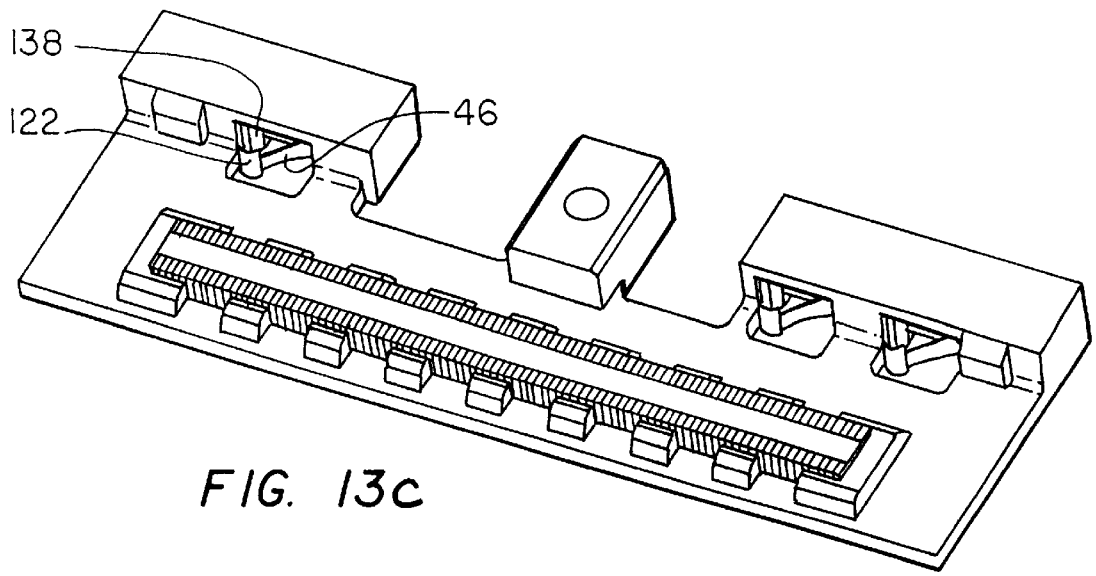
Figure 14:
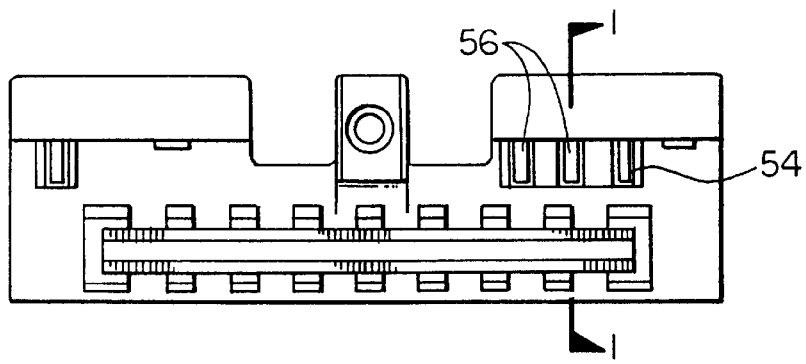
FIGS. 14 is a top view of an interface connector having vertically deflecting power/ground contacts.
Figure 16:
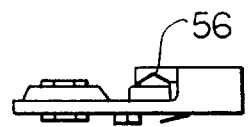
FIGS. 16–19 further illustrate vertically deflecting power/ground contacts.
Figure 15:
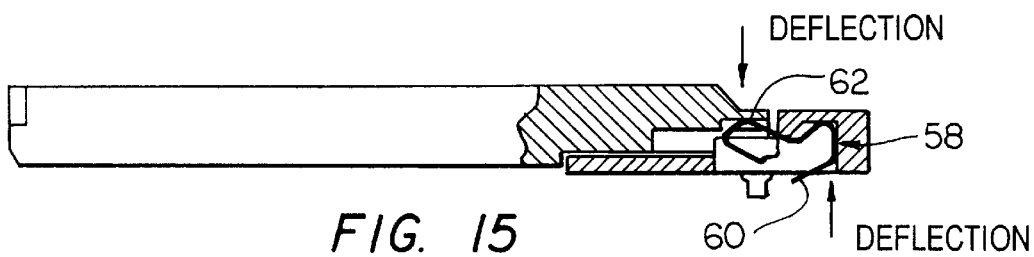
FIG. 15 is a cross sectional view of the interface connector of FIG. 14 and the miniature card taken along line 1—1.
Figure 17:
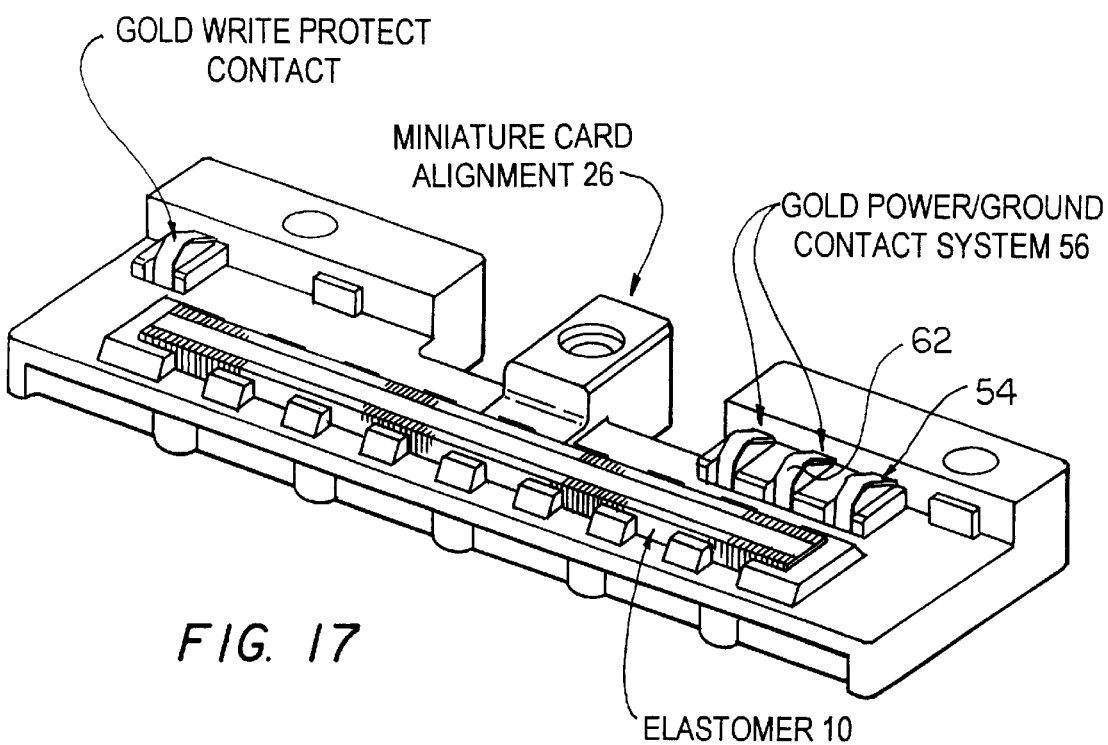
Figure 18:
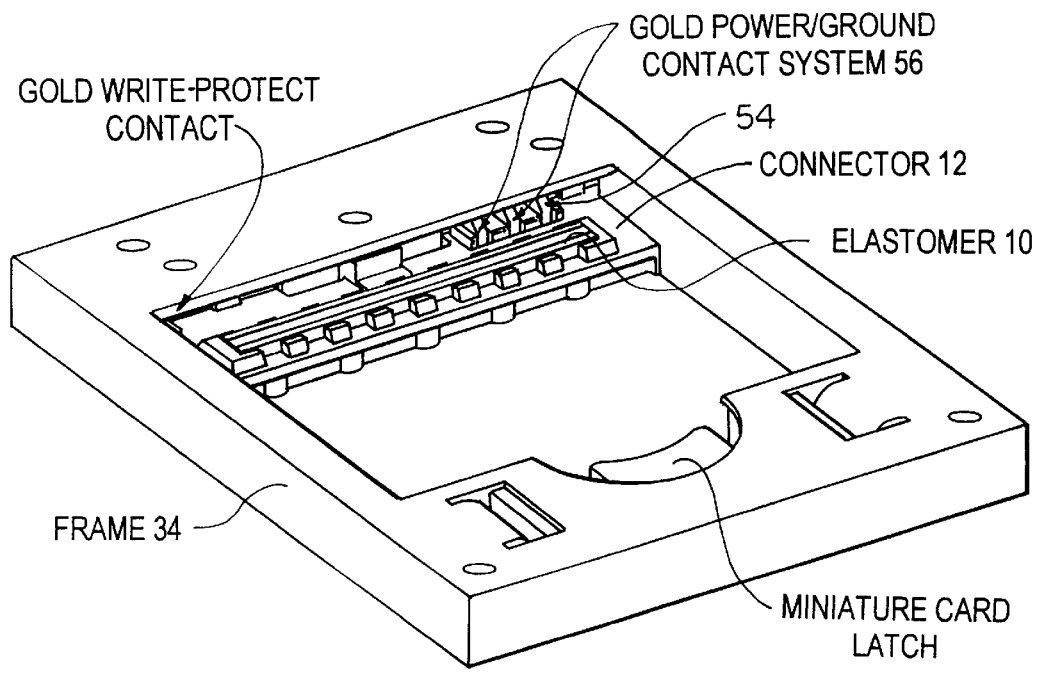
Figure 19:
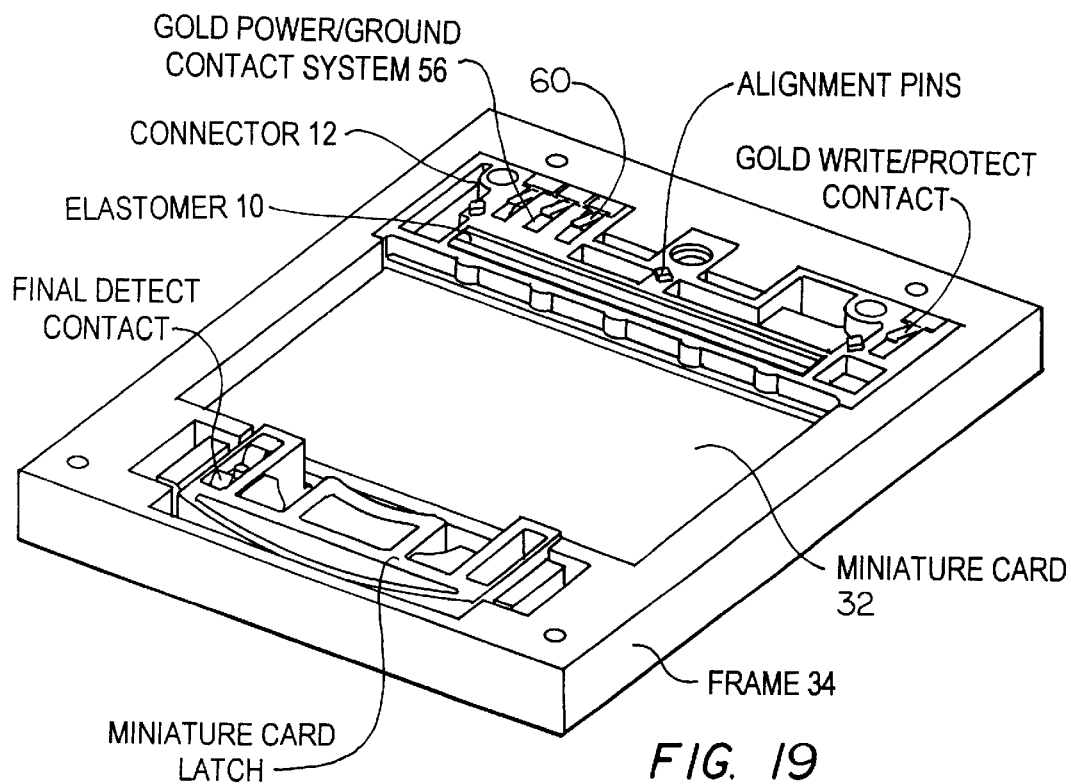

The power and ground connectors 16, 14 which electrically connect the miniature card to the interface connector are illustrated with greater detail in FIGS. 11–13. The power and ground connectors each include an upper arm section 46 and a lower arm section 48 which are connected at an intersection 50 surface. The lower arm 48 extends downward from the intersection 50 and is curved away therefrom. The upper arm 46 extends outward to one side of the intersection 50 and curves away therefrom such that when the connector is placed in the slot 52 in the insulating body, the upper arm 46 extends out of the slot 52 with sufficient space for deflection, and the lower arm 48 extends below the insulating body with sufficient space for deflection as the interface connector is secured in the frame. In operation, the upper arm 46 electrically connects to contacts on the miniature card by deflecting horizontally as force is applied thereagainst. The lower arm 48 deflects vertically against pads on the host PCB. Barbs 120 which extend from the intersection surface 50 facilitate securing the connector in the interface connector slot by anchoring against the slot walls. The connectors may be fashioned from a single piece of conductive metal by stamping or other suitable techniques known in the art.

Referring now to FIGS. 12, 13, 13a, 13b, 13c, the power and ground connectors have features which facilitate reliable operation. The upper and lower arms each include an enlarged contact surface 122, 124 at the respective ends thereof opposite the intersection 50 surface. The enlarged contact surfaces provide a relatively large surface area for achieving electrical connection with corresponding pads on the miniature card and host PCB, thereby improving reliability. Further, the upper enlarged contact surface includes an anti-overstress feature. The upper contact surface 122 includes first and second arcuate edges 126, 128, respectively. To alleviate overstress during deflection, the first edge 126 has a greater length than the second edge 128. The upper arm 46 also includes three radii 130, 132, 134 which deflect at different rates. Further, the slot 52 window through which the upper arm extends in the interface connector is formed with a wall 136 to support the first radius 130 during deflection in order to alleviate overstress and to provide greater contact force against the corresponding pad on the miniature card PCB. An anti-overstress surface 138 in the window prevents the upper arm from being deflected past a given point within the window. More particularly, the enlarged contact surface 122 contacts the anti-overstress surface 138 when the upper arm 46 is fully deflected, and the upper arm is prevented from deflecting further by the anti-overstress surface which blocks the path of further deflection.

As illustrated in FIGS. 14–19, alternative power 54 and ground 56 contacts on the interface connector operate to connect corresponding contacts on the miniature card with contacts on the host by deflecting vertically against the miniature card and host device contacts. Each interface connector power and ground contact 54, 56 is formed from a ribbon-like conductive metal strip. The contacts 54, 56 include a substantially straight securing section 58 which is secured to the interface connector by insertion into the preformed slot in the insulating body. A host contacting portion 60 of the interface connector contact is located adjacent to the securing section and is operative to deflect vertically (upwards) as the interface card is placed in the host. Downward deflective force maintains contact between the host contacting portion and the corresponding host contact. A miniature card contacting portion 62 of the interface connector contact is located adjacent to the securing section 58. The miniature card contacting portion is formed into a partial loop which prevents the contact end from being damagingly jammed into the miniature card. The miniature card contacting portion 62 deflects vertically downward as the miniature card is inserted into the interface connector, and deflective force maintains electrical connection between the contacting portion and the corresponding pad on the miniature card. It will therefore be appreciated that the contacts 54, 56 deflect vertically when contacting both the host pads and the miniature card pads.

Figure 20:
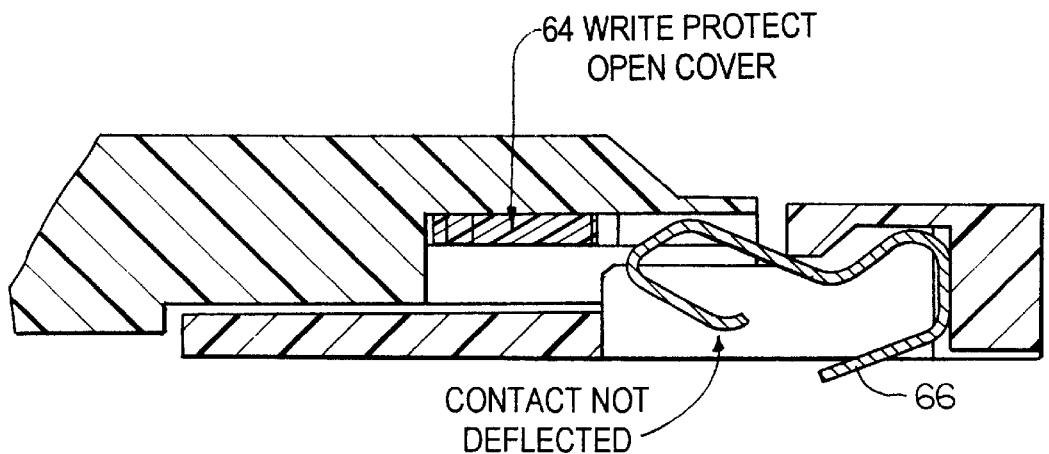
FIGS. 20–21 illustrate the write-protect feature.
Figure 21:
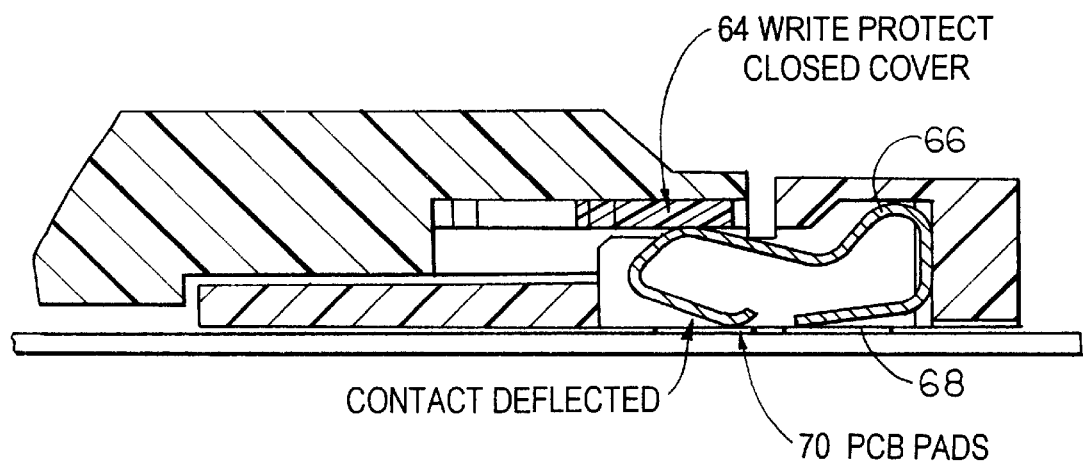

As illustrated in FIGS. 20–21, the miniature card may include a write-protect tab 64 for providing selectable write protection for writable miniature card devices. The interface connector includes a write-protect contact 66 which is normally electrically connected to a first host write-protect pad 68, i.e., the interface connector stays resident in the host. The write-protect tab 64 operates to control electrical connection between the first write-protect pad 68 and a second write-protect pad 70. The write-protect tab 64 is a nonconductive panel which can be slidably moved to deflect the write-protect contact and thereby cause the contact to electrically connect with the second write-protect pad 70. The write-protect tab can also be slidably moved away from the write-protect tab to un-deflect the contact 66 away from the second write-protect pad 70. Circuitry within the host can be utilized to prevent writing of data when a predetermined voltage potential is not present at the first write-protect pad 68.

Figure 22:
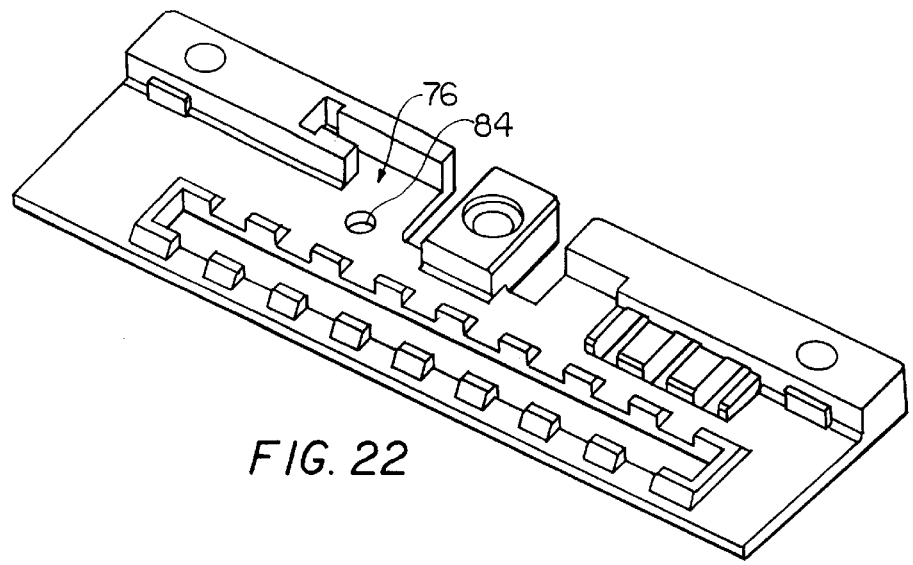
FIGS. 22–24 illustrate the keying feature.
Figure 23:
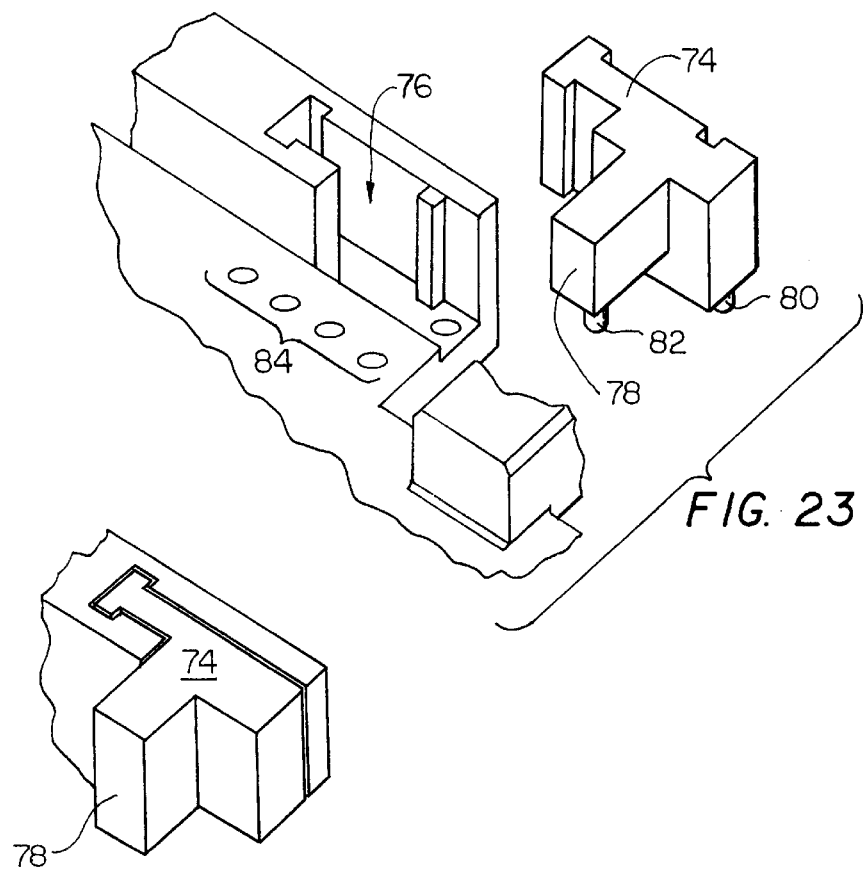
Figure 24:
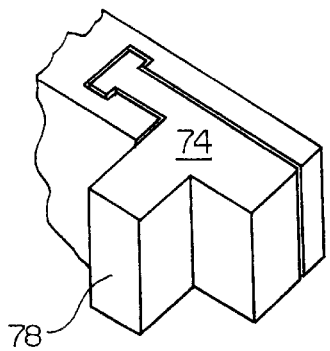
Figure 25:
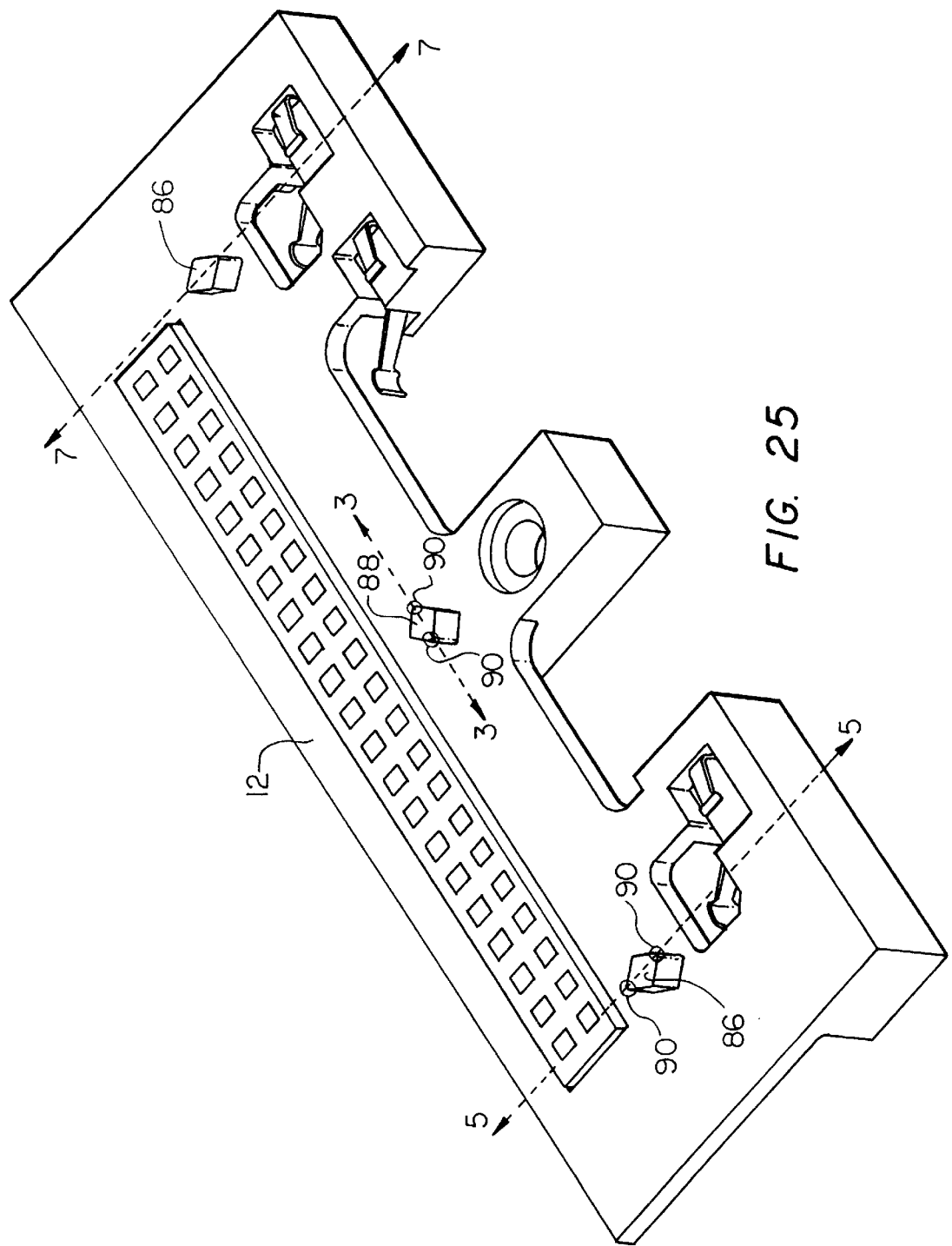

Referring now to FIGS. 22–23, the interface connector may also include a keying feature for selectively accepting and rejecting insertion of predetermined types of miniature cards. It is envisioned that different types of miniature cards may be configured for different voltage levels. The keying feature could be employed to, e.g., prevent insertion of a +3V flash memory miniature card into a host device which is designed for a +5V flash memory (and provides +5V at the power contacts). The keying feature employs an irregularly shaped plastic insert 74 which is shaped to fit in a corresponding irregularly shaped keyhole 76 in the insulating body. The insert includes a tab portion 78 which prevents insertion of incompatible miniature cards. The plastic insert includes a first peg 80 for aligning and securing the insert in place and a second peg 82 for aligning and securing the tab 78. The interface connector includes at least one hole 84 for accommodating tab pegs 82. Hence, a variety of tab patterns including pluralities of tabs may be accommodated such that a single design of insulating body can be customized to accept any of various compatible miniature cards, while rejecting incompatible miniature cards, by insertion of an appropriate plastic insert. Gaps on the miniature card corresponding to the tabs on the interface connector insert 74 would thereafter physically block insertion of incompatible cards in the same manner as described with respect to the keying feature 72 above.

Features which facilitate alignment of the interface connector with respect to the host device are shown in FIGS. 25–30. More particularly, the interface connector includes outer location pins 86 and a center location pin 88 disposed on the flat bottom surface. The pins have a diamond-shaped cross-section, and are adapted to interface tightly with corresponding circular holes in the host. Each location pin includes two outermost edges 90 which are separated by a length dimension 92 approximately equal to the diameter dimension of the holes. The pins and holes thereby provide a point contact, interference fit which provides proper and secure alignment with tolerance within a predetermined range of dimensional mismatch between the hole diameter and the length dimension. Such a mismatch could be caused by manufacturing tolerance variation.

The insulating body 12 may include recesses 94 around the location pins for accepting waste material produced during assembly. When the pin is inserted into the hole during assembly, excess material at the contact point, typically a thin plastic shaving, is sheared away. In the absence of a recess such excess material could jam between the interface connector and the host, thereby inhibiting proper insertion and alignment. By forming recesses into which the pins are disposed, material shaved away during insertion of the pin into the hole is deposited in the recess and thereby does not interfere with proper insertion and alignment.

The location pins are arranged to inhibit twisting and shifting of the interface connector relative to the host. More particularly, the center pin 88 is ninety degrees out of phase relative to the other pins. The center pin 88 contact points 90 are aligned along a first axis 3—3, and the outer pin contact points are aligned along parallel axes 5—5, 7—7. This arrangement provides static positioning relative to the axes 3—3, 5—5, 7—7, and prevents rotation of the interface connector around the center pin 88.

Alternative shapes for the location pins may also be utilized. As shown in FIG. 29, alternative pins 96 may have a circular cross-section and include a plurality of radial ribs. Each radial rib can potentially form a point contact 98. Thus, greater tolerance for manufacturing process variation may be realized with an associated possible increase in force required to insert the pin into the hole. In another alternative embodiment shown in FIG. 30, five location pins are utilized. A center location pin 100 is oriented along a first axis 9—9 and outer location pins 102, 104, 106, 108 are oriented along parallel axes 11—11, 13—13, 15—15, 17—17, respectively, which are perpendicular to the first axis 9—9. Further, the location pins include bevelled point contact edges 110 which facilitate insertion of the interface connector into the host.

It should be understood that the invention is not limited to the particular embodiments shown and described herein, and that various changes and modifications may be made without departing from the spirit and scope this novel concept as defined by the following claims.

What is claimed is:

1. An interface connector for connecting pads on a printed circuit board in a miniature card to pads on a printed circuit board in a host device, comprising:

an elastomeric connection device with top and bottom surfaces and a plurality of electrical connections which provide electrical pathways between said top and bottom surfaces;

an electrically insulating body with an upper surface having an opening disposed therein, said opening adapted to receive said elastomeric connection device, said insulating body further adapted to be received by the host, and to receive the miniature card, such that the top surface of the elastomeric connection device comes into contact with, and is deflected by, the miniature card and the bottom surface of the elastomeric connection device comes into contact with, and is deflected by, the host when the host device, interface connector and miniature card are interconnected;

a power contact disposed on said insulating body; and a ground contact disposed on said insulating body, whereby pads disposed on the miniature card printed circuit board are connected to corresponding pads on the host device printed circuit board.

2. The interface connector of claim 1 wherein said power and ground contacts each have a conductive metal arm section formed to deflect vertically as the miniature card is placed in the host.

3. The interface connector of claim 1 wherein said power and ground contacts each have a first arm section which deflects horizontally and connects to corresponding conductors on the miniature card, and a second arm section which deflects vertically and connects to corresponding conductors on the host.

4. The interface connector of claim 3 wherein said first arm section includes an enlarged contact surface with first and second arcuate edges.

5. The interface connector of claim 4 wherein said first arcuate edge is longer than said second arcuate edge.

6. The interface connector of claim 5 wherein said second arm section includes an enlarged contact surface.

7. The interface connector of claim 4 wherein said insulating body includes a wall which limits the extent to which said first arm section is deflected.

8. The interface connector of claim 4 wherein said first arm section is connected to said second arm section by an intersection surface, and said first arm section includes a first, second and third radius sections, said first radius section connected to said intersection surface, said third radius section connected to said enlarged contact surface and said second radius section connected to said first and second radius sections, said first radius section disposed against said insulating body to reduce the possibility of overstressing of the first arm section.

9. The interface connector of claim 1 further including a write-protect contact.

10. The interface connector of claim 1 wherein said insulating body further includes a castellated side wall.

11. The interface connector of claim 10 wherein the upper surface of said elastomeric connection device extends out of said opening above the upper surface of the insulating body such that, as the miniature card is inserted into the host device, said interface connector power and ground contacts enter electrical communication with corresponding contacts on the miniature card before said elastomeric connection device enters electrical communication with corresponding pads disposed on the miniature card.

12. The interface connector of claim 1 wherein said insulating body includes at least one location pin adapted to interface with circular holes in the host device to align the interface connector with the host device.

13. The elastomeric connection device of claim 12 wherein each of said location pins has a diamond-shaped cross section.

14. The interface connector of claim 13 wherein said insulating body includes five location pins extending therefrom.

15. The interface connector of claim 14 wherein said location pins have bevelled point contact edges.

16. The interface connector of claim 13 wherein said interface connector includes a plurality of location pins and at least a first location pin is disposed ninety degrees out of phase relative to a second location pin.

17. The interface connector of claim 12 wherein said location pins have a circular cross-section and include a plurality of radial ribs, each location pin thereby providing a plurality of contact points.

18. The interface connector of claim 1 wherein said insulating body includes a separately inserted keying feature including an insert which is secured to said insulating body to prevent insertion of incompatible miniature cards.

19. The interface connector of claim 18 wherein said insert includes at least one tab portion operative to block insertion of a miniature card which lacks a corresponding gap portion.

20. The interface connector of claim 1 wherein said insulating body includes an alignment post with beveled edges for facilitating alignment of the miniature card with respect to the interface connector.

21. An interface device for connecting pads on a printed circuit board in a miniature card to pads on a printed circuit board in a host device, comprising:

an elastomeric connection device with top and bottom surfaces and a plurality of electrical connections which provide electrical pathways between said top and bottom surfaces;

an electrically insulating body with an upper surface having an opening disposed therein, said opening adapted to receive said elastomeric connection device, said insulating body further adapted to be received by the host, and to receive the miniature card, such that the top surface of the elastomeric connection device comes into contact with, and is deflected by, the miniature card and the bottom surface of the elastomeric connection device comes into contact with, and is deflected by, the host when the host device, interface connector and miniature card are interconnected;

a power contact disposed on said insulating body;

a ground contact disposed on said insulating body; and a frame section disposed on the printed circuit board and having a plurality of walls, a latch and an opening, said opening formed to receive said insulating body, said elastomeric device and the miniature card, said latch having a movable portion which occupies a first position when the miniature card is disposed in the frame section and a second position when the miniature card is not disposed in the frame section, said latch including a detect contact with first and second high points moving therewith, whereby pads disposed on the miniature card printed circuit board are connected to corresponding pads on the host device printed circuit board, and a short condition between at least two pads on the printed circuit board is created by said detect contact in a selected one of said first and second latch positions.

22. The interface connector of claim 21 wherein said power and ground contacts each have a conductive metal arm section formed to deflect vertically as the interface card is placed in the host.

23. The interface connector of claim 21 wherein said power and ground contacts each have a first arm section which deflects horizontally and connects to corresponding conductors on the miniature card, and a second arm section which deflects vertically and connects to corresponding conductors on the host.

24. The interface connector of claim 23 wherein said first arm section includes an enlarged contact surface with first and second arcuate edges.

25. The interface connector of claim 24 wherein said first arcuate edge is longer than said second arcuate edge.

26. The interface connector of claim 25 wherein said second arm section includes an enlarged contact surface.

27. The interface connector of claim 25 wherein said insulating body includes a wall which limits the extent to which said first arm section is deflected.

28. The interface connector of claim 25 wherein said first arm section is connected to said second arm section by an intersection surface, and said first arm section includes a first, second and third radius sections, said first radius section connected to said intersection surface, said third radius section connected to said enlarged contact surface and said second radius section connected to said first and second radius sections, said first radius section disposed against said insulating body to reduce the possibility of overstressing of the first arm section.

29. The interface connector of claim 21 further including a write-protect contact.

30. The interface connector of claim 21 wherein said insulating body further includes a castellated side wall.

31. The interface connector of claim 30 wherein the upper surface of said elastomeric connection device extends out of said opening above the upper surface of the insulating body such that, as the miniature card is inserted into the host device, said interface connector power and ground contacts enter electrical communication with corresponding contacts on the miniature card before said elastomeric connection device enters electrical communication with corresponding pads disposed on the miniature card.

32. The interface connector of claim 21 wherein said insulating body includes at least one location pin adapted to interface with circular holes in the host device to align the interface connector with the host device.

33. The elastomeric connection device of claim 32 wherein each of said location pins has a diamond-shaped cross section.

34. The interface connector of claim 33 wherein said insulating body includes five location pins extending therefrom.

35. The interface connector of claim 34 wherein said location pins have bevelled point contact edges.

36. The interface connector of claim 33 wherein said interface connector includes a plurality of location pins and at least a first location pin is disposed ninety degrees out of phase relative to a second location pin.

37. The interface connector of claim 32 wherein said location pins have a circular cross-section and include a plurality of radial ribs, each location pin thereby providing a plurality of contact points.

38. The interface connector of claim 21 wherein said insulating body includes a separately inserted keying feature including an insert which is secured to said insulating body to prevent insertion of incompatible miniature cards.

39. The interface connector of claim 38 wherein said insert includes at least one tab portion operative to block insertion of a miniature card which lacks a corresponding gap portion.

40. The interface connector of claim 21 wherein said insulating body includes an alignment post with beveled edges for facilitating alignment of the miniature card with respect to the interface connector.

* * * * *